(12) United States Patent
Korolev et al.

(10) Patent No.: US 8,868,402 B2
(45) Date of Patent: Oct. 21, 2014

(54) CONSTRUCTION OF TEXT CLASSIFIERS

(75) Inventors: Dmitry Korolev, Unteriberg (CH);
Hartmut Maennel, Zurich (CH);
Matthias Heiler, Zurich (CH); Michael Schaer, Flaach (CH); Thomas Hofmann, Zollikon (CH); Wojciech Gajewski, Zurich (CH); Justyna Sidorska, Zollikon (CH)

(73) Assignee: Google Inc., Mountain View, CA (US)

( * ) Notice: Subject to any disclaimer, the term of this patent is extended or adjusted under 35 U.S.C. 154(b) by 528 days.

(21) Appl. No.: 12/650,443

(22) Filed: Dec. 30, 2009

(65) Prior Publication Data
US 2013/0138641 A1 May 30, 2013

(51) Int. Cl.
*G06F 17/30* (2006.01)
*G06F 15/00* (2006.01)

(52) U.S. Cl.
CPC .............. *G06F 17/30* (2013.01); *G06F 15/00* (2013.01)
USPC ................ 704/1; 707/708; 707/771

(58) Field of Classification Search
CPC ................. G06F 15/00; G06F 17/30
USPC ........... 704/1, 9; 707/738, 740; 715/234, 257
See application file for complete search history.

(56) References Cited

U.S. PATENT DOCUMENTS

| | | | |
|---|---|---|---|
| 6,704,905 B2 * | 3/2004 | Fukushige et al. | 715/234 |
| 6,937,994 B1 * | 8/2005 | Iyengar | 705/7.29 |
| 7,254,774 B2 * | 8/2007 | Cucerzan et al. | 715/257 |
| 7,440,944 B2 * | 10/2008 | Selvaraj et al. | 1/1 |
| 7,529,731 B2 * | 5/2009 | Bier | 1/1 |
| 7,725,414 B2 * | 5/2010 | Nigam et al. | 706/45 |
| 2002/0022956 A1 * | 2/2002 | Ukrainczyk et al. | 704/9 |
| 2002/0099730 A1 * | 7/2002 | Brown et al. | 707/500 |
| 2002/0138529 A1 * | 9/2002 | Yang-Stephens et al. | 707/530 |
| 2003/0225763 A1 * | 12/2003 | Guilak et al. | 707/7 |
| 2004/0049498 A1 * | 3/2004 | Dehlinger et al. | 707/3 |
| 2005/0234953 A1 * | 10/2005 | Zhang et al. | 707/101 |
| 2006/0069678 A1 * | 3/2006 | Chou et al. | 707/5 |
| 2006/0074908 A1 * | 4/2006 | Selvaraj et al. | 707/6 |
| 2006/0085405 A1 * | 4/2006 | Hsu et al. | 707/3 |
| 2006/0142993 A1 * | 6/2006 | Menendez-Pidal et al. | 704/9 |
| 2006/0143175 A1 * | 6/2006 | Ukrainczyk et al. | 707/6 |
| 2006/0178869 A1 * | 8/2006 | Acero et al. | 704/10 |
| 2006/0212423 A1 * | 9/2006 | Jones et al. | 707/2 |
| 2008/0243479 A1 * | 10/2008 | Cafarella et al. | 704/9 |
| 2008/0249764 A1 * | 10/2008 | Huang et al. | 704/9 |
| 2009/0055381 A1 * | 2/2009 | Wu et al. | 707/5 |
| 2010/0094875 A1 * | 4/2010 | Harrison et al. | 707/741 |

OTHER PUBLICATIONS

Matsumoto et al. ("Sentiment Classification Using Word Sub-sequences and Dependency Sub-trees"), PAKDD 2005, LNAI 3518, pp. 301-311, Springer-Verlag Berlin Heidelberg 2005.*

(Continued)

*Primary Examiner* — Jialong He
(74) *Attorney, Agent, or Firm* — Fish & Richardson P.C.

(57) ABSTRACT

Methods, systems, and apparatus, including computer program products, for constructing text classifiers. The method includes receiving a collection of candidate phrases for a given topic; filtering the received candidate phrases to remove erroneously included candidate phrases; assigning weights to the candidate phrases including scoring each candidate phrase using an initial classifier and assigning weights to the candidate phrases based on the scores; and generating a linear classifier using the filtered and weighted candidate phrases, where the linear classifier varies the weights for each phrase candidate depending on the length of the document being classified.

19 Claims, 5 Drawing Sheets

(56) References Cited

OTHER PUBLICATIONS

McCallum et al. ("Employing EM and Pool-based active learning for text classification"), Proceedings of ICML-98, 15th International Conference on Machine Learning, San Francisco, 1998.*

Mann et al. ("Simple, Robust, Scalable Semi-Supervised learning via Expectation Regularization"), Proc. $24^{th}$ International Conference on Machine Learning, 2007.*

Peng et al. "Combining Naive Bayes and n-Gram Language Models for Text Classification", ECIR 2003, LNCS 2633, pp. 335-350, Springer-Verlag Berlin Heidelberg, 2003.*

Lewis, et al. "Training algorithms for linear text classifier", Proceedings of the 19th annual international ACM SIGIR conference on Research and development in information retrieval, 1996.*

Jarvelin et al. "s-grams: Defining generalized n-grams for information retrieval", Information Processing and Management 43 (2007) 1005-1019.*

Siu et al. "Variable N-Grams and Extensions for Conversational Speech Language Modeling", IEEE Transactions on Speech and Audio Processing, vol. 8, No. 1, Jan. 2000.*

Guthrie, David, et al. "A closer look at skip-gram modelling." Proceedings of the 5th international Conference on Language Resources and Evaluation (LREC-2006). 2006.*

Ifrim et al., "Fast Logistic Regression for Tex Categorization with Varible-Length N-grams," KDD '08 Aug. 24-27, 2008, Las Vegas, Nevada, 9 pages.

\* cited by examiner

CONSTRUCTION OF TEXT CLASSIFIERS

BACKGROUND

This specification relates to constructing text classifiers.

In Web search, advertising, or for special content providers, documents (e.g., Web pages and Web sites) can be given a high value if they are associated with a particular topic of interest and a low value if they are associated with an irrelevant or offensive topic. A topic can be a subject, theme, or category of interest, for example, "baseball", "politics", "weather."

Thus, it is useful to be able to classify documents (e.g., particular Web pages or Web sites as a whole) as belonging to certain topics. One conventional technique for classifying documents is to use a linear classifier that uses the document text. Linear classifiers include a number of phrases known to be indicative of a given topic and a value for each of the phrases. The document is classified as belonging to the topic in question if the sum of the values for all of the phrases occurring in the document exceeds a specified threshold.

SUMMARY

This specification describes technologies relating to constructing text classifiers.

In general, one aspect of the subject matter described in this specification can be embodied in methods that include the actions of receiving a collection of candidate phrases for a given topic; filtering the received candidate phrases to remove erroneously included candidate phrases; assigning weights to the candidate phrases including scoring each candidate phrase using an initial classifier and assigning weights to the candidate phrases based on the scores; and generating a linear classifier using the filtered and weighted candidate phrases, where the linear classifier varies the weights for each phrase candidate depending on the length of a document being classified. Other embodiments of this aspect include corresponding systems, apparatus, and computer program products.

These and other embodiments can optionally include one or more of the following features. Generating phrase candidates further includes extracting n+k-grams from a collection of documents as extracted candidate phrases. Extracting n+k-grams from a particular document of a collection of documents includes receiving a document; breaking the document content into pieces of text; and extracting n+k-grams from each piece of text where n is a base order of the n-gram and k is a variable number of skip words. Generating phrase candidates further includes assigning scores to each Web site of a collection of Web sites corresponding to a probability of belonging to a certain topic; sorting n-grams in the collection of Web sites according to their occurrence in one or more of the plurality of Web sites having a threshold probability of belonging to the topic; and extracting n-grams of phrase candidates from a specified number of high probability Web sites.

Generating phrase candidates further includes receiving query log information associating queries with one or more Web sites identified as responsive to the query; for a set of Web sites identified in the log for which an associated topic is known, identifying a number of frequently submitted queries associated with those Web sites of the set; and using the frequently submitted queries as candidate phrases for the topic of the associated Web pages.

Generating phrase candidates further includes receiving a set of seed phrases, each with an estimate of a fraction of documents belonging to a particular topic among all documents containing the seed phrase; receiving an estimate of a fraction of all documents belonging to the topic; using the received seed phrases and estimates as an input along with a collection of labeled documents and a collection of unlabeled documents to train a linear classifier that approximately reproduces the estimated fractions; and using phrases identified by training the linear classifier as candidate phrases. The candidate phrases exclude the seed phrases. Scores for documents obtained from other classifiers are used as additional input to train the classifier.

Filtering further includes issuing each of the received phrase candidates as queries to a search engine; classifying one or more search results identified by the search engine for each query as belonging to a specific topic; specifying a threshold of off-topic results with respect to search results identified by a query; and eliminating candidate phrases that exceed the threshold as candidate phrases for the topic.

In general, one aspect of the subject matter described in this specification can be embodied in methods that include the actions of receiving a collection of phrase candidates; receiving an initial classifier; assigning to each candidate phrase an average score of a document that contains the phrase candidate using the initial classifier; ordering candidate phrases by score and assigning weights to the phrase candidates as a function of the score; and generating a linear classifier using the phrase candidates and the assigned weights. Other embodiments of this aspect include corresponding systems, apparatus, and computer program products.

These and other embodiments can optionally include one or more of the following features. The method further includes determining whether multiple iterations are to be performed; and when additional iterations are to be performed, using a previously generated linear classifiers as the initial classifier for the next iteration. The method further includes for each iteration determining whether supervised improvement is to be performed for the iteration; when supervised improvement is to be performed: sampling documents of a specified length; rating the sampled documents; and using the rated document to correct weights for the phrase candidates; and generating the linear classifier using the phrase candidates and the corrected weights. Correcting the assigned weights includes using a perceptron or support vector machine to correct phrase candidate weights. Performing additional iterations includes performing one or more iterations without supervised improvement and one or more iterations with supervised improvement.

In general, one aspect of the subject matter described in this specification can be embodied in methods that include the actions of receiving collection of phrase candidates; receiving an initial classifier; assigning a first weight to each phrase candidate using the initial classifier; generating a second classifier using the assigned first weights of the phrase candidates; assigning a second weight to each phrase candidate using the second classifier; and generating a third classifier using the assigned second weights of the phrase candidates. Other embodiments of this aspect include corresponding systems, apparatus, and computer program products.

In general, one aspect of the subject matter described in this specification can be embodied in methods that include the actions of receiving a collection of documents associated with a topic; generating a collection of candidate phrases using the collection of documents including extracting n+k-grams from the documents where n is a base order of an n+k-gram and k is a variable number of skip words where each n+k-gram begins and ends with a non skip word and includes exactly n non skip words; and generating a document classifier for the topic using the candidate phrases. Other embodiments of this aspect include corresponding systems, apparatus, and computer program products.

Particular embodiments of the subject matter described in this specification can be implemented to realize one or more of the following advantages. Accurate classifiers for particular topics can be generated with only small amounts of human labeled data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
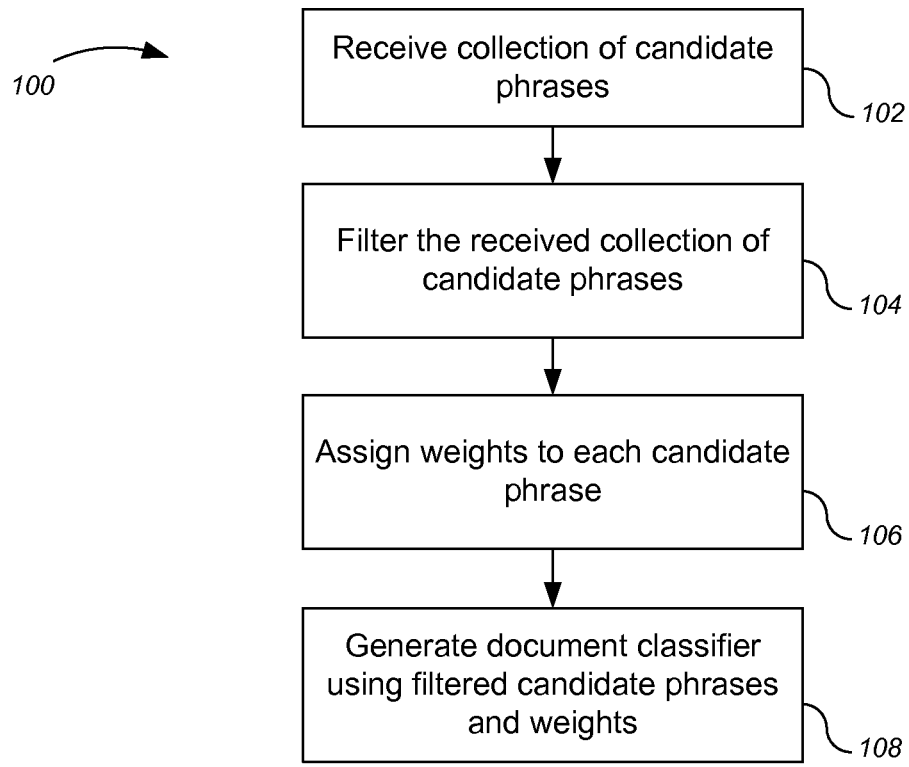
FIG. 1 shows a flowchart of an example method of classifying a document.

FIG. 1 shows a flowchart of an example method 100 of classifying a document. For convenience, the method 100 is described with respect to a system that performs the method 100.

The system receives 102 a collection of candidate phrases. The collection of candidate phrases can be received from an external source of pre-generated candidate phrases or, alternatively, the candidate phrases can be generated by the system. In some implementations, the received candidate phrases are an existing collection generated, for example, from human experts. Alternatively, candidate phrases can be automatically generated from a collection of documents known to belong to a topic of interest (e.g., labeled by human raters) and a collection of documents known not to belong to the topic of interest. The generating system can then identify phrases that occur more often in the documents known to belong to the topic than they occur in the other documents. Those phrases are identified as candidate phrases.

The candidate phrases can be n-grams of text extracted from the documents. In particular, a phrase can be defined as a specified sequence of words that have a particular semantic meaning when taken alone. For example, the phrases "sound of rain" or "heavy drops" as opposed to non-phrases "of rain" or "heavy". Alternatively, in some implementations, any n-grams can be sued without being defined as phrases. Typically, n-gram phrases of order greater than 1 can provide higher quality candidate phrases. In some implementations, the order of n is fixed. However, in other implementations, the value of n can be flexible. Example techniques for generating candidate phrases (for example, from a collection of documents, Web pages scores, or from search queries) are described in greater detail below.

The system filters 104 the received collection of candidate phrases. In particular, the system filters the candidate phrases to remove candidate phrases that are mistakenly part of the collection. In particular, using statistical methods to generate candidate phrases, there are some number of phrases that are erroneously added to the collection of candidate phrases. Removing the erroneous phrases from the collection of candidate phrases can improve classifier results.

The system assigns 106 weights to each candidate phrase. In some implementations, the system performs the assignment of weights and the filtering 104 concurrently or as part of a single technique. For example, an assigned weight of zero effectively filters out a given candidate phrase. Example techniques for filtering and assigning weights to candidate phrases are described in greater detail below.

In some implementations, the system adjusts the classifier. In some implementations, the classifier is adjusted to correct weights assigned to the phrases in the classifier. For example, weights can need to be corrected when a systematic error allows some phrases to be part of the classifier that are not associated with the topic of interest to the classifier. Example correction techniques are described in greater detail below.

The system generates 108 a linear document classifier using the filtered and weighted resulting phrases. In particular, the generated document classifier can be a linear classifier having the filtered candidate phrases as input phrases, each having an assigned weight.

In some implementations, the generated classifier can be adjusted to take text length into account. In particular, using scores generated from phrase candidates only having positive weights can bias the classification of topicality to longer length documents. However, whether a given topic is affected by document length and to what degree can vary. The system can learn the dependency of text length from labeled examples which can then be used to adjust the classifier.

One learning process to adjust the classifier for text length takes as input a set of tiples $(s_i, n_i, l_i)$ where $s_i$ is a score assigned by a classifier for document i. $n_i$ is the number of words in the document, and $l_i$ is the label (e.g., true or false, depending on whether the document belongs to the topic of interest). The output of the learning process is a decision function that assigns a label to each pair (s, n) of score and document length. The decision function can be generated using various learning techniques, for example, adaptive boosting "AdaBoost" or support vector machines "SVM's". A particular function can be trained that translates from the score output by the decision function to a probability that the document has the given topic.

Additionally, monotonic regression can be used in place of a decision function, e.g., AdaBoost or SVM's, in order to provide a probability that a document belongs to the topic and learned in one step. For a given text score s, it is possible that the score is less indicative of a particular topic the longer the document is. This is since even documents that do not belong to the particular topic have a certain probability of containing one or more of the candidate phrases for the topic. However, for longer documents there is a greater probability of such a phrase occurring than for shorter documents. Consequently, the probability that a document having a known score s and length n belongs to the given topic, expressed as a function p(i, −n) is monotonic in both variables. Therefore, a monotonic regression can be applied to the function p(s, −n) to learn the function p from labeled examples.

The resulting document classifier can be applied to a set of documents in order to identify those documents of the collection which belong to a particular topic targeted by the classifier. For example, for a given document, the output of the classifier determines whether the document belongs to the topic or not based on a combination of weights for the phrases identified in the document (e.g., based on comparing a sum of phrase weights to a threshold).

Generating Phrase Candidates

Figure 2:
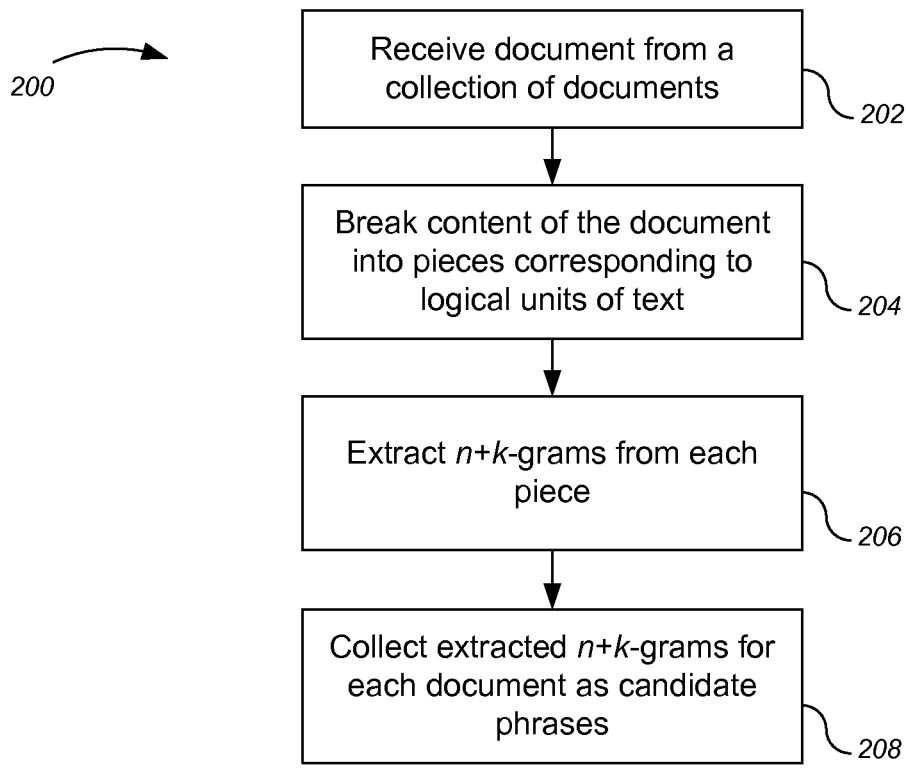
FIG. 2 shows a flowchart of an example method of generating candidate phrases using n+k-grams.

FIG. 2 shows a flowchart of an example method 200 of generating candidate phrases using n+k-grams. For convenience, the method 200 is described with respect to a system that performs the method 200.

The system receives 202 a document from a collection of documents from which phrase candidates are to be extracted. The system breaks 204 the content of the document into pieces of text that are likely to constitute logical units. Specifically, the system performs breaks at every HTML structure tag (e.g., div, tr, li, p, title, h1-h6, form, hr, dl, dd, dt, td, tr, th, option, img, pre, blockquote). The system also performs a break at each user-defined or language-specific punctuation character. In some implementations, the document text is further processed to drop any remaining punctuation, convert the text to lowercase, and remove text duplicates.

For example, if the only punctuation character specified was a comma, the following HTML code:

```
Come and hear the sound of rain, its <b>heavy</b> drops:
<ul>
<li>plim-plum
<li>plim-plum
</ul>
``` would be broken into the following pieces of text:

```
come and hear the sound of rain
its heavy drops
plim plum
```

The system extracts 206 n+k-grams from each piece of text separately so that they do not cross piece boundaries. For each language, the system defines n (the base order of an n+k-gram) and a list of skip words. Skip words include common words with little or no semantic meaning on their own, for example, articles, prepositions, and pronouns. An n+k-gram starts and ends at a non-skip word, contains exactly n non-skip works and a variable number (k) of skip words that come in-between them.

Continuing the above example, if n=2 and skip words include "and", "its", "of", and "the" the following n+k-grams are extracted:

```
come and hear
hear the sound
sound of rain
heavy drops
plim plum
```

The system collects 208 the extracted n+k-grams for each document as candidate phrases of the collection for use in a document classifier for a particular topic.

In some alternative implementations, Web site scores are used to generate candidate phrases from a collection of Web documents. The system receives a collection of Web sites. The system assigns to each of the Web sites a probability of belonging to a certain topic based on a monotonic regression combining of scores of different site classifiers. For all n-grams (e.g., for n<5) that appear on at least N (e.g., 100) Web sites, the system determines the portion of Web sites having a particular threshold probability of belonging to the topic or, alternatively, takes a top percentile of the Web sites (e.g., top 20%). The system then sorts the n-grams by the portion (e.g., based on probability). The n-gram phrases that tend to be particularly indicated of the given topic tend to appear early in this list. The system extracts the top n-grams as candidate phrases. For example, the top 1000 n-grams can be used as candidate phrases.

In some other alternative implementations, particular search queries can be used as candidate phrases. The system receives query logs and associated Web sites (e.g., Web sites identified as responsive to the respective queries. For a set of Web sites in the collection having a known topic association (e.g., based on results from an initial classifier or from keywords in search results that roughly identify document topics) the system can obtain a number of most frequently submitted queries that result in a particular Web site being identified in the search results (e.g., from search logs). For example, the system can obtain a top 100 queries that result in the Web site being identified as a top search result. In some implementations, the most frequently submitted queries are assessed over a specified time period (e.g., 6 weeks). The resulting queries are used as candidate phrases for the topic associated with the particular Web site.

Figure 3:
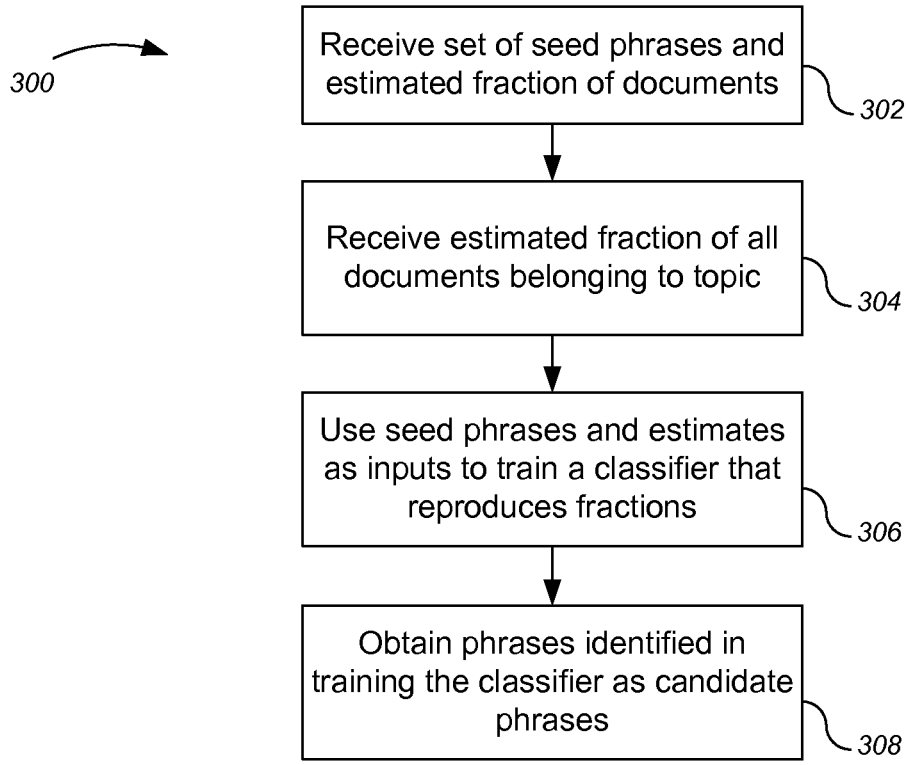
FIG. 3 shows a flowchart of an example method of generating candidate phrases using expectation regularization.

In some other implementations, phrase candidates are generated using expectation regularization. FIG. 3 shows a flowchart of an example method 300 of generating candidate phrases using expectation regularization. For convenience, the method 300 is described with respect to a system that performs the method 300.

The system receives 302 a set of seed phrases with an estimate of a fraction of documents belonging to a given topic among all documents containing the feature. The set of seed phrases can be obtained from human experts. For example, human raters can identify that the phrase 'Seattle Mariners' is a seed phrase for the topic of 'baseball'. The system also receives 304 an estimate for a fraction of all documents belonging to a given topic. Again, human experts can provide the estimates. For example, a human expert can determine that a document containing the phrase 'Seattle Mariners' has a 95% chance of being about baseball and that a document containing 'Ichiro Suzuki' has a 95% chance of being about baseball (e.g., based on rough estimates or experimental evidence from sampling for each phrase). The system uses 306 the received seed phrases and estimates as input along with a small set of labeled documents and a larger set of unlabeled documents to train a linear classifier that reproduces these fractions as closely as possible. In the linear classifier, all possible words (or n-grams) can occur as candidate phrases. Further details of expectation regularization techniques are described in Gideon S. Mann and Andrew McCallum, "Simple, Robust, Scalable Semi-supervised Learning via Expectation Regularization" in Proceedings of the $24^{th}$ International Conference on Machine Learning, Corvallis, Oreg., 2007.

The system obtains 308 new candidate phrases from the output classifier. To obtain new phrases indicative of a given topic, the system examines those phrases of the output classifier having highest coefficients (i.e., the weights from the classifier where the sum for each phrase would be used when classifying documents based on the output classifier alone).

In some implementations, the technique is modified to exclude input phrases in the linear classifier from being provided as outputs to the system. Thus, the system can use the classifier to identify new candidate phrases. The system uses the phrases generated by training the linear classifier as candidate phrases of a document classifier.

Other types of features can be used as input in addition to candidate phrases occurring in documents. For example, scores of other classifiers (e.g., image classifiers) or site scores as described above can be used as input features. Additionally, a simple score of "1 if belonging to a known set of documents of this topic, 0 else" can be used as an input feature. The scores of additional classifiers provide additional input to the classifier. For example, a classifier can have the following four input features for classifying a document: 1) the phrase 'Seattle Mariners' occurs in the document, 2) the phrase 'Ichiro Suzuki' occurs in the document, 3) the document has an image score above 0.9, and 4) the document is a known baseball Web site. The output features from the classifier will all be phrases. The non-phrase features are added as input to recognize more documents as belonging to a topic. In some implementations, all input features (phrases included) are discarded such that only newly generated phrases are used (e.g., if their coefficients/weights are above a threshold level).

In some implementations, identified phrase candidates are positive features, that is the features are indicative that the document belongs to the given topic. However, the phrase candidates can also include negative features that indicate that the document does not belong to the topic (e.g., by assigning negative weights to the negative features).

Filtering Candidate Phrases

Phrase candidates can be pre-filtered before assigning weights in order to improve performance of weight assignment. One technique uses a Web search combined with a classifier of pages on a given topic.

Figure 4:
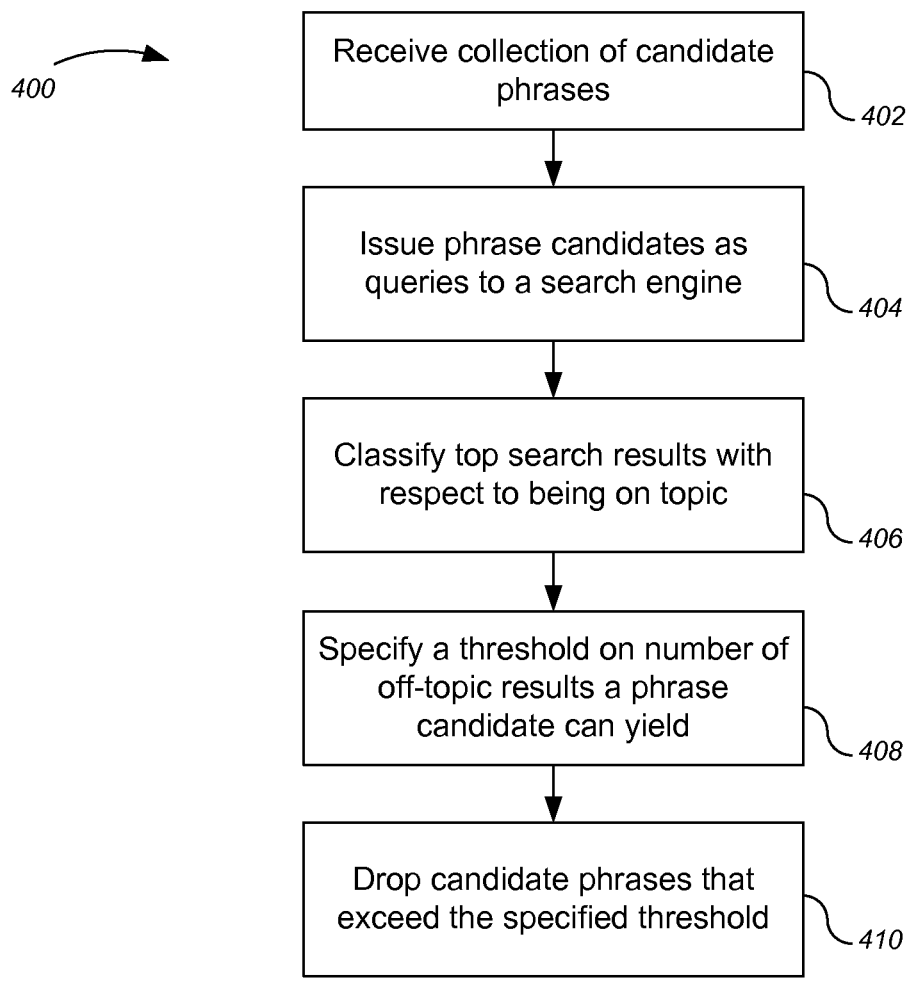
FIG. 4 shows a flowchart of an example method of filtering candidate phrases using web search.

FIG. 4 shows a flowchart of an example method 400 of filtering candidate phrases using Web search. For convenience, the method 400 is described with respect to a system that performs the method 400.

The system receives 402 a collection of candidate phrases. The candidate phrases can be generated as described above or received as a pre-generated collection. The system issues 404 the candidate phrases as queries to a search engine. For example, each candidate phrase can be specified in quotes and then submitted to the search engine. In some implementations, the system further specifies a language for the results. For each submitted query, the system classifies 406 the top n search results (e.g., top ten results) with respect to being on a given topic (e.g., using an initial (less precise) classifier, keywords in URLs, or as belonging to a Web site known to be associated with the topic).

The system specifies 408 a threshold on a number of off-topic results that a candidate phrase can yield (e.g., a number from 1-10). The system then drops 410 candidate phrases that exceed the specified threshold.

In some implementations, the classifier is tuned for high recall to maximize the identification of good candidate phrases at the cost of allowing some bad phrase candidates to pass through. Consequently, the classifier can classify Web pages based on the URL of a search result. For example, the classifier can consider a Web page to be on a given topic if its URL either belongs to a list of URLs on the topic or contains any of the language-specific keywords characteristic for pages on the topic (e.g., based on human input identifying some keywords). For example, a human expert can enter keywords into a search engine and look at the URL's of the identified search results. Additionally, the URLs of the results can lead the human expert to identify additional keywords to a list commonly used in URLs of the topic. These can then be used to automatically identify a larger collection of potential keywords and phrase candidates.

Assigning Weights to Candidate Phrases

Once a collection of candidate phrases is received or generated, each candidate phrase is assigned a weight for use with a classifier. In some implementations, an existing initial classifier is used to assign weights to phrase candidates.

Figure 5:
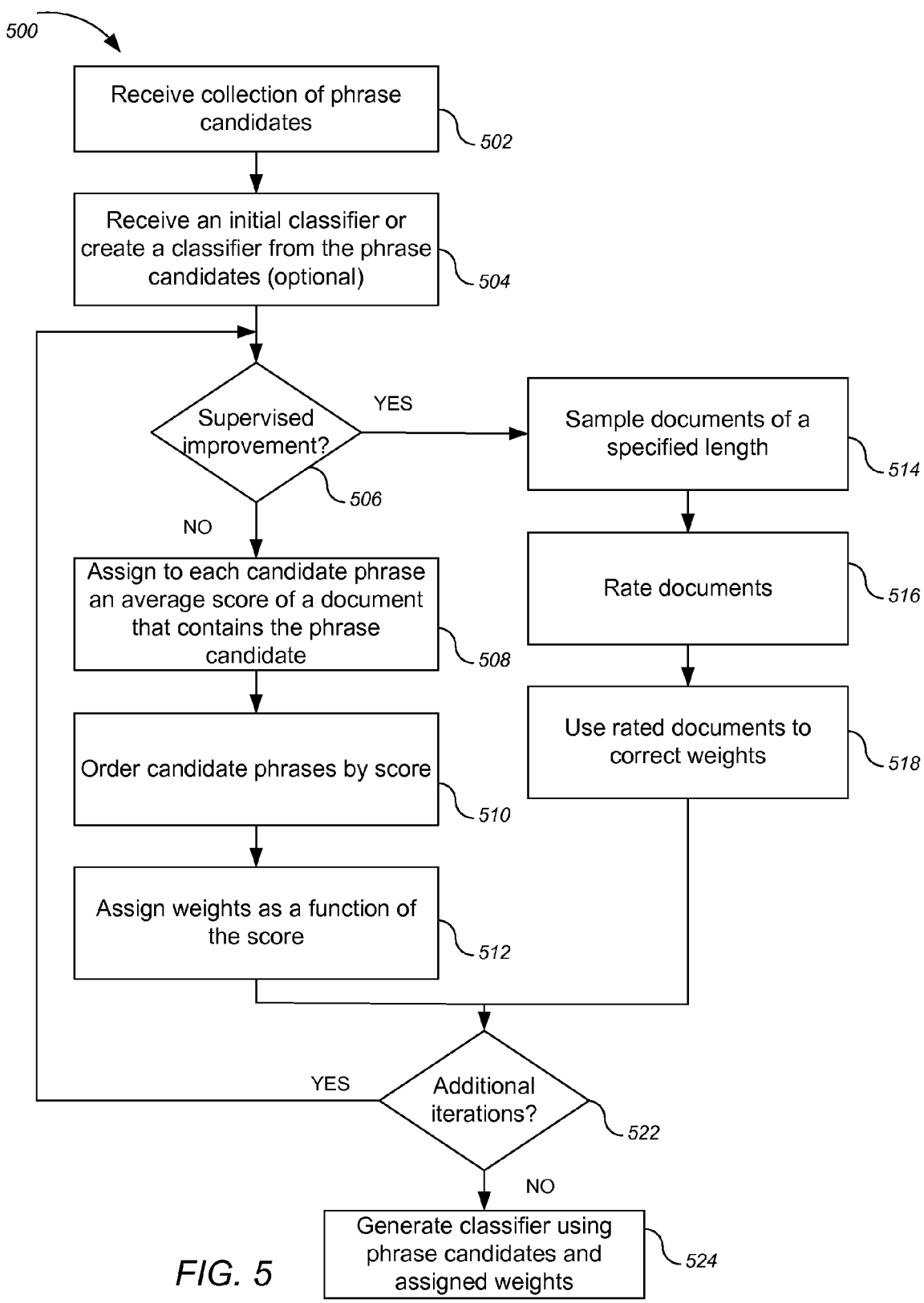
FIG. 5 shows a flowchart of an example method of using a collection of phrase candidates to iteratively generate a classifier.

FIG. 5 shows a flowchart of an example method 500 of using a collection of phrase candidates to iteratively generate a classifier. For convenience, the method 500 is described with respect to a system that performs the method 500.

The system receives 502 a collection of phrase candidates. The phrase candidates can be generated as described above or received as a pre-generated collection. The received phrase candidates are presumed to be associated with a given topic of interest.

The system optionally receives 504 an initial classifier or creates a classifier from the phrase candidates (assigning weight 1 to all phrase candidate that occur). The initial classifier is a classifier that assigns a score to a document such that the higher the score is, the more likely that the document belongs to the specified topic. If no initial classifier is given, the phrase candidates themselves can be used as a classifier by assigning each of them the weight 1.

The initial classifier can be a basic linear classifier constructed using a few phrase candidates (e.g., to provide a rough estimate of whether documents belong to a topic), or an older classifier that is to be improved. Alternatively, the initial classifier can simply be represented by a collection of documents on the given topic (e.g., a collection of Web sites belonging to the topic). In such a scenario, the system assigns a score of 1 to documents in the collection on the topic and a score of zero to other documents.

For a given set of phrase candidates, it can be assumed that most of the phrase candidates actually belong to the topic in question or that it is known that some portion of the phrase candidates are actually indicative of the topic. Therefore, documents of the topic usually contain several of the phrase candidates. Thus, if a feature often occurs alone on a document, the feature may not be a good phrase.

In some other implementations, the initial classifier weights documents by assigning a weight of 1 to the "most trusted" phrases and zero for other candidate phrases (or alternatively a higher weight for the "most trusted" phrases and a weight of 1 for other candidate phrases). In some implementations, where a part of the collection has a higher confidence than other parts, then only the portion with a high confidence is used.

The system determines 506 whether to perform supervised improvement. Supervised improvements can be used to correct weights assigned to phrase candidates for use in a classifier, for example, using a perceptron or support vector machine technique described in greater detail below. In particular, the supervised improvement can identify and correct for systematic errors. The unsupervised technique is simpler and does not require human raters. Large amounts of data are used and can improve all phrase candidate weights, but can miss clusters of semantically related erroneous phrase candidate features. However, the supervised techniques are also more expensive (e.g., in terms of time and rater resources) to perform, and therefore for efficiency can be used only to correct a few weights of the most common phrase candidates as well as to identify clusters of semantically related, but wrong, phrase candidates.

When not performing supervised improvement and given the initial classifier, the system assigns 508 a score to each phrase candidate. The assigned score (e.g., as output from the initial classifier) can correspond to an average score of a document that contains the phrase candidate. The phrase candidates are ordered 510 by the score s and the weights are assigned 512 $f(s)$ with a monotonic function $f$.

For example, the system can use the weights: 0="not indicative of the topic", 1="could occur on a document with that topic, but also on other pages", 2="usually pages which contain this phrase candidate belongs to the topic", and 3="a document containing this phrase candidate almost certainly belongs to the topic". A threshold is used to decide whether a given phrase has a particular assigned weight value (e.g., whether to give the phrase a weight of 2 or 3 based on the output score of the initial classifier). Optionally, phrases removed from the classifier by having a weight of zero can be excluded from subsequent training iterations, which are described in greater detail below. In some implementations, long documents and short documents are considered separately or excluded since they may require different weighting thresholds.

In some implementations, the initial classifier assigns a score of 1 for a document classified as belonging to the topic T and 0 otherwise (i.e., a binary classifier). The average score of the documents containing a phrase candidate X therefore corresponds to the probability $p(T|X)$ that a document that contains X is classified as belonging to T.

In this scenario an automatic procedure based on a "Naïve Bayes assumption" can alternatively be used to assign weights automatically. The Naïve Bayes assumption is that the occurrence of different phrase candidates are statistically independent given the topic of the document. In this scenario the system calculates from the results of the document classification a fraction $p(T)$ of documents belonging to the topic and calculates $K=\log(1-p(T))-\log(p(T))$. For each feature X the weight is calculated as $w(X)=\log(p(T|X)) \log(1-p(T|X))+K$. This is a specific function of $p(T|X)$ that can be computed automatically and is a result of statistical assumptions. Under the same assumptions the threshold for the resulting classifier can be calculated.

In some implementations, some phrase candidates that occur more often on documents of a given topic will also occur in clusters of features that are correlated because they also appear on documents of a different, but related topic. This violates the Naïve Bayes assumption and results in pages that do not belong to the topic accumulating feature weights such that the pages will be classified as belonging to the topic. Consequently, the definition of w can be modified to select lower weights and/or to remove features with low weight in order to avoid misclassification of documents.

Supervised Improvement

When the system determines 506 that supervised improvement is performed, the system samples 514 documents of a specific approximate length. The length used can vary depending on the application. For example, in some implementations, the sampled documents have a length of approximately 1000 words (e.g., 750 to 1250 words). The number of sampled documents can also vary. In some implementations, 2000 documents are sampled.

The system rates 516 each of the sampled documents. In particular, human raters can be used to manually rate the sampled documents as belonging to the given topic or not (e.g., a score of 1 or 0). One or more raters can be used for each document. In some implementations, three to five raters are used per document as a control.

The system uses 518 the rated documents as input for a particular supervised improvement technique, e.g., SVM or perceptron. More specifically, a value is assigned to each phrase candidate occurring in each document. This value is assigned, for example, by an initial classifier, as a 1 if the phrase candidate occurs in the document and zero otherwise, as the number of times the phrase candidate occurs in the document, or according to a monotonic increasing function of the number of times the phrase candidate occurs. This value is then input to the supervised improvement technique. Additionally, the rater decision as well as initial classifier scores, if used, are input to the supervised improvement technique. The output of the supervised improvement technique is a weight correction for one or more of the phrase candidates.

The system can use a correction step during supervised improvement, for example, to remove erroneous phrases from the collection of candidate phrases or modify weights to generate correct classification results. For example, for a given linear classifier generated for a collection of phrases and associated weights, the system can test the classification for a set of documents for which it is known whether they belong to a particular topic. If a document is misclassified, the system adjusts the weight of all of the phrases up or down until the document is correctly classified. Testing a small set of known documents one or more times adjusts the weights such that more of the labeled documents are correctly classified by the classifier. For example, a perceptron technique can be used to correct the classifier.

In some other implementations, support vector machines are used to correct feature weights. Support vector machines ("SVM's") are a set of related supervised learning methods used for classification and regression. A generated linear classifier can be input as one feature in the SVM. The other features can be other features (i.e. phrases) from a co-occurrence training technique described above as those phrases selected for use or those scoring over a specified threshold. An SVM regularization constant can be selected to provide a modest correction that limits the amount that weights are modified.

In addition to using SVM's to tune the collection of phrases globally, they can alternatively be used to tune each individual feature by rescaling the particular feature. Consequently, instead of using a value of one for an input feature vector to the SVM if the phrase is present, the system uses an entry c for some number c that is lower for phrases that have a high level of confidence. As a result, the SVM has to "pay more" to change the weight assigned to the phrase, i.e. a change of that weight counts more towards the penalty introduced with the regularization. One way to identify phrases that have a high level of confidence is to identify those already observed in a number of documents in previous steps (e.g., in previous iterations).

When the SVM has computed the additional weights for one or more phrases, the additional weights are added to the existing weights for phrases in the classifier. In some implementations, when training the SVM, the system uses documents having a common approximate length.

In some implementations, instead of, or in addition to, the regularization constant for the SVM, a multiplier is applied to the SVM correction (e.g., 0.6) to ensure that the SVM does not over fit the training data.

In both supervised and non-supervised scenarios, the system determines 522 whether additional iterations are to be performed. For each iteration, the process returns to the determining of whether to perform supervised improvement. Thus, some iterations can use supervised improvement while others do not. One example iterative schedule can begin with two iterations of the unsupervised method to remove any clearly erroneous features, then perform one supervised iteration to remove any clusters of semantically related wrong features. The system can then perform another two iterations of the unsupervised method, and then a final iteration of the supervised method to make sure the common features are optimally weighted. How the supervised and unsupervised methods are applied, as well as how many are scheduled, can depend on the application, quality of the initial classifier, and available resources.

The iterative process reduces noise in the phrase weights. If there is a systematic error in the input collection of candidate phrases that includes a large number of phrases of one particular other topic, the phrases from this other topic may survive the iteration. Consequently, a supervised correction step can be included to eliminate such phrases.

Following such a correction, one or more new iterations can be performed either supervised or unsupervised. In some implementations, this co-occurrence technique is combined with techniques using existing classifiers in order to generate a weighted collection of phrase candidates for use in classifying documents. Alternatively, both techniques can be used and the resulting phrase weights averaged.

When no additional iterations are performed, the system generates 524 a classifier using the phrase candidates and assigned weights from the last iteration. In some implementations, the number and type of iterations is fixed by a specified schedule. In some other implementations, a stopping criteria is used, e.g., based on changes to weights made in the previous iteration.

Once the linear classifier has been generated for the identified and weighted phrase candidates, the resulting phrases candidates are to classify documents as belonging to a particular topic. For example, documents can be input to the classifier and decisions output as to whether or not the document belongs to the topic classified by the classifier.

The above techniques for generating a collection of phrase candidates and assigning weights yield n-grams $X_i$ and weights $w(X_i)$. However, in general, it is possible for n-grams to overlap or to be substrings of each other. This can degrade performance since it effectively provide additional weight on longer n-grams that are more likely to have substrings among the collection of phrase candidates.

The system can adjust the weights of substrings in order to correct for the bias given to longer n-grams. In particular, for two n-grams i and j where $X_i$ is a substring of $X_j$, the score for the two n-grams will be independently calculated such that the score is $w(x_i)+w(x_j)$. In the Naïve Bayes case described above, this corresponds to computing $\log(p(X_i|T))-\log(p(X_i|N))+\log(p(X_j|T))-\log(p(X_j|N))$. The system corrects the weight $w(X_j)$ to $w'(X_j)$ such that $w'(X_j)=[\log(p(X_j|T))-\log(p(X_j|N))]-[\log(p(X_i|T))-\log(p(X_i|N))]=w(X_j)-w(X_i)$ to provide a final score of $w'(X_j)+w(X_i)=\log(p(X_j|N))-\log(p(X_j|N))$.

This correction can be applied to all chains of n-grams $X_{ik}$ where $X_{ik}$ is a substring of $X_{i(k+1)}$ by sorting the n-grams according to length and iteratively subtracting the weights of the shorter n-grams from all their parents. In cases where the sum of the weights of the substrings exceeds the weights of an n-gram, the corresponding n-gram may be dropped from the list of phrase candidates.

Figure 6:
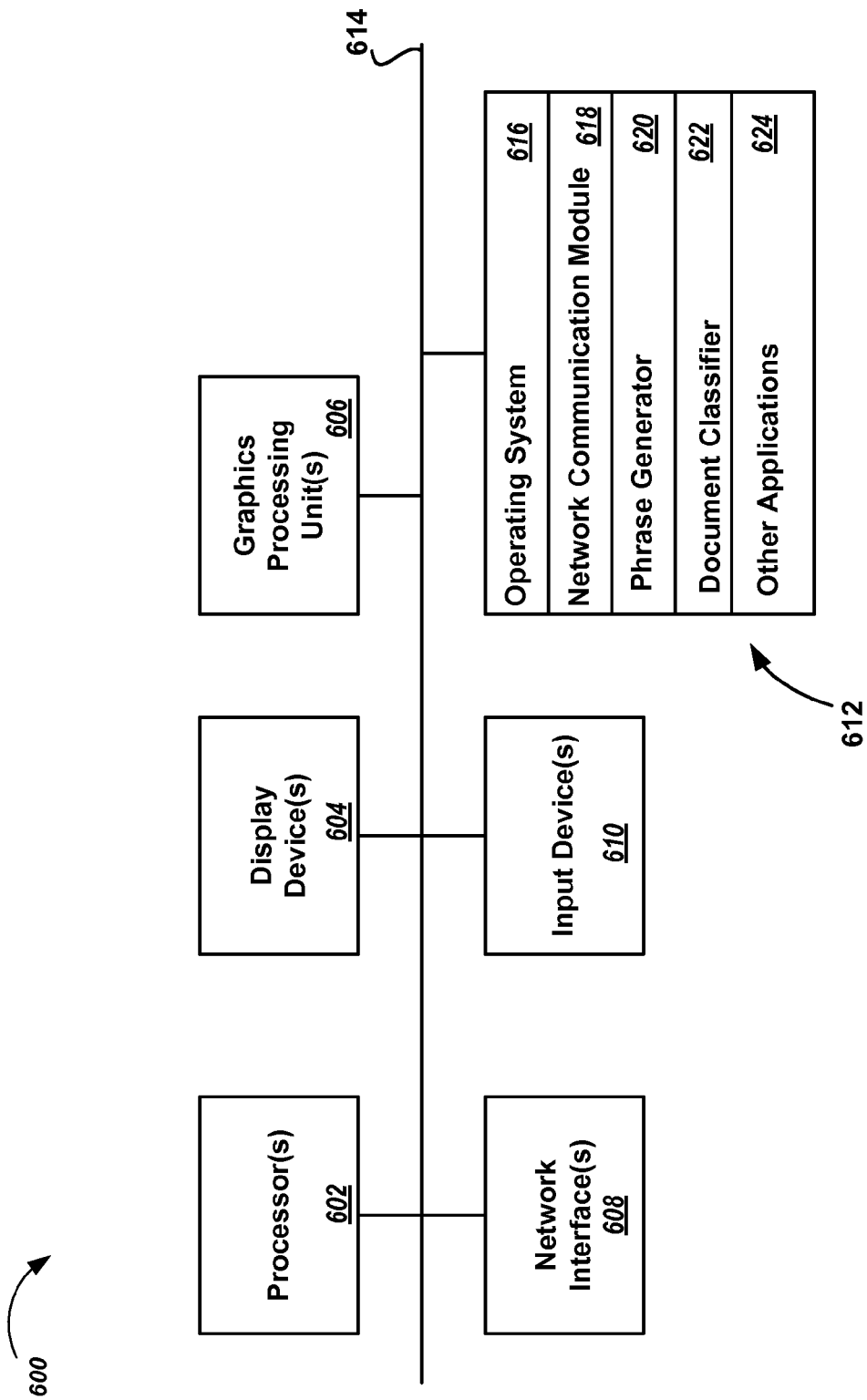
FIG. 6 illustrates an example system architecture.

FIG. 6 illustrates an example system architecture 600. The system architecture 600 is capable of performing operations for constructing text classifiers. The system architecture 600 includes one or more processors 602 (e.g., IBM PowerPC, Intel Pentium 4, etc.), one or more display devices 604 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data using one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, a phrase generator 620, and a document classifier 622.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.).

The phrase generator 620 and document classifier 622 provide various software components for performing the various functions for generating candidate phrases for use in training a document classifier and classifying documents as belonging to a topic as described with respect to FIGS. 1-5.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a collection of candidate phrases for a given topic;
filtering the received candidate phrases to remove erroneously included candidate phrases;
assigning weights to the candidate phrases, wherein assigning weights includes:
scoring each candidate phrase using an initial classifier, and
assigning a weight to each of the candidate phrases based on the respective scores from the initial classifier;
generating a linear classifier using the filtered and weighted candidate phrases; and
adjusting the linear classifier depending on a length of a document being classified, wherein adjusting the linear classifier includes determining whether and to what degree the given topic is affected by document length based on a learning process using a set of labeled example documents, each example document including a score assigned by the linear classifier, the length of the example document, and a label assigned to the example document, wherein the learning process outputs a decision function that assigns a particular label to each pair of score and document length such that a probability that a particular document having a given score from the linear classifier belongs to the topic depends on the length of the document.

2. The method of claim 1, where the received phrase candidates:
   are n+k-grams extracted from a collection of documents as extracted candidate phrases.

3. The method of claim 2 where extracting n+k-grams from a particular document of a collection of documents comprises:
   receiving a document;
   breaking the document content into pieces of text; and
   extracting n+k-grams from each piece of text where n is a base order of the n-gram and k is a variable number of skip words.

4. The method of claim 1, where the received phrase candidates are generated by:
   assigning scores to each Web site of a collection of Web sites corresponding to a probability of belonging to a certain topic;
   sorting n-grams in the collection of Web sites according to their occurrence in one or more of the plurality of Web sites having a threshold probability of belonging to the topic; and
   extracting n-grams of phrase candidates from a specified number of high probability Web sites.

5. The method of claim 1, where the received phrase candidates are generated by:
   receiving query log information associating queries with one or more Web sites identified as responsive to the query;
   for a set of Web sites identified in the log for which an associated topic is known, identifying a number of frequently submitted queries associated with those Web sites of the set; and
   using the frequently submitted queries as candidate phrases for the topic of the associated Web pages.

6. The method of claim 1, where the received phrase candidates are generated by:
   receiving a set of seed phrases, each with an estimate of a fraction of documents belonging to a particular topic among all documents containing the seed phrase;
   receiving an estimate of a fraction of all documents belonging to the topic;
   using the received seed phrases and estimates as an input along with a collection of labeled documents and a collection of unlabeled documents to train a linear classifier that approximately reproduces the estimated fractions; and
   using phrases identified by training the linear classifier as candidate phrases.

7. The method of claim 6, where the candidate phrases exclude the seed phrases.

8. The method of claim 6, where scores for documents obtained from other classifiers are used as additional input to train the linear classifier.

9. The method of claim 1, where filtering further comprises:
   issuing each of the received phrase candidates as queries to a search engine;
   classifying one or more search results identified by the search engine for each query as belonging to a specific topic;
   specifying a threshold of off-topic results with respect to search results identified by a query; and
   eliminating candidate phrases that exceed the threshold as candidate phrases for the topic.

10. A system comprising:
    one or more computers configured to perform operations including:
    receiving a collection of candidate phrases for a given topic;
    filtering the received candidate phrases to remove erroneously included candidate phrases;
    assigning weights to the candidate phrases, wherein assigning weights includes:
       scoring each candidate phrase using an initial classifier, and
       assigning a weight to each of the candidate phrases based on the respective scores from the initial classifier;
    generating a linear classifier using the filtered and weighted candidate phrases; and
    adjusting the linear classifier depending on a length of a document being classified, wherein adjusting the linear classifier includes determining whether and to what degree the given topic is affected by document length based on a learning process using a set of labeled example documents, each example document including a score assigned by the linear classifier, the length of the example document, and a label assigned to the example document, wherein the learning process outputs a decision function that assigns a particular label to each pair of score and document length such that a probability that a particular document having a given score from the linear classifier belongs to the topic depends on the length of the document.

11. The system of claim 10, where the received phrase candidates:
    are n+k-grams extracted from a collection of documents as extracted candidate phrases.

12. The system of claim 11 where extracting n+k-grams from a particular document of a collection of documents comprises:
    receiving a document;
    breaking the document content into pieces of text; and
    extracting n+k-grams from each piece of text where n is a base order of the n-gram and k is a variable number of skip words.

13. The system of claim 10, where the received phrase candidates are generated by:
    assigning scores to each Web site of a collection of Web sites corresponding to a probability of belonging to a certain topic;
    sorting n-grams in the collection of Web sites according to their occurrence in one or more of the plurality of Web sites having a threshold probability of belonging to the topic; and
    extracting n-grams of phrase candidates from a specified number of high probability Web sites.

14. The system of claim 10, where the received phrase candidates are generated by:
    receiving query log information associating queries with one or more Web sites identified as responsive to the query;
    for a set of Web sites identified in the log for which an associated topic is known, identifying a number of frequently submitted queries associated with those Web sites of the set; and
    using the frequently submitted queries as candidate phrases for the topic of the associated Web pages.

15. The system of claim 10, where the received phrase candidates are generated by:
    receiving a set of seed phrases, each with an estimate of a fraction of documents belonging to a particular topic among all documents containing the seed phrase;

receiving an estimate of a fraction of all documents belonging to the topic;

using the received seed phrases and estimates as an input along with a collection of labeled documents and a collection of unlabeled documents to train a linear classifier that approximately reproduces the estimated fractions; and using phrases identified by training the linear classifier as candidate phrases.

16. The system of claim 15, where the candidate phrases exclude the seed phrases.

17. The system of claim 15, where scores for documents obtained from other classifiers are used as additional input to train the linear classifier.

18. The system of claim 10, where filtering further comprises:

issuing each of the received phrase candidates as queries to a search engine;

classifying one or more search results identified by the search engine for each query as belonging to a specific topic;

specifying a threshold of off-topic results with respect to search results identified by a query; and eliminating candidate phrases that exceed the threshold as candidate phrases for the topic.

19. A computer program product, stored on a non-transitory computer readable medium, comprising instructions that when executed on a server cause the server to perform operations comprising:

receiving a collection of candidate phrases for a given topic;

filtering the received candidate phrases to remove erroneously included candidate phrases;

assigning weights to the candidate phrases, wherein assigning weights includes:

scoring each candidate phrase using an initial classifier, and assigning a weight to each of the candidate phrases based on the respective scores from the initial classifier;

generating a linear classifier using the filtered and weighted candidate phrases; and adjusting the linear classifier depending on a length of a document being classified, wherein adjusting the linear classifier includes determining whether and to what degree the given topic is affected by document length based on a learning process using a set of labeled example documents, each example document including a score assigned by the linear classifier, the length of the example document, and a label assigned to the example document, wherein the learning process outputs a decision function that assigns a particular label to each pair of score and document length such that a probability that a particular document having a given score from the linear classifier belongs to the topic depends on the length of the document.

* * * * *